June 28, 1966  A. FISCHER  3,257,889
EXPANSION SHIELD

Filed Aug. 8, 1963  4 Sheets-Sheet 1

INVENTOR.
ARTUR FISCHER
BY
Michael S. Striker
Attorney

June 28, 1966  A. FISCHER  3,257,889
EXPANSION SHIELD
Filed Aug. 8, 1963  4 Sheets-Sheet 2
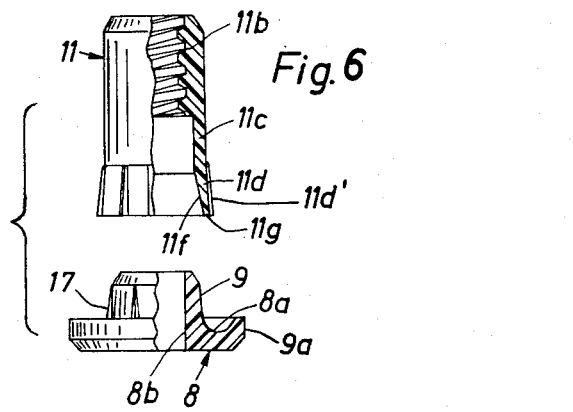
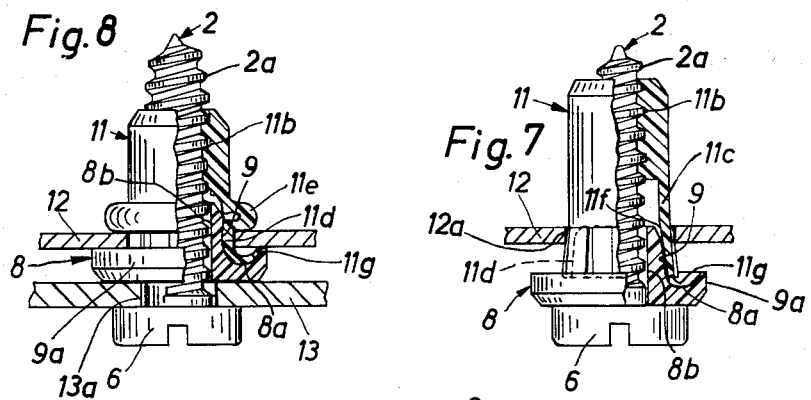
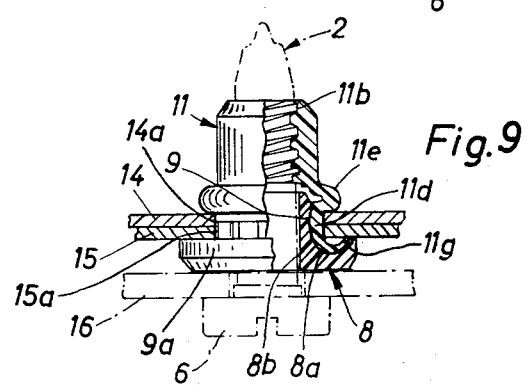
INVENTOR.
ARTUR FISCHER
BY Michael S. Striker
Attorney

INVENTOR.
ARTUR FISCHER

United States Patent Office 3,257,889
Patented June 28, 1966

3,257,889
EXPANSION SHIELD
Artur Fischer, Tumlingen, Kreis Freudenstadt, Germany
Filed Aug. 8, 1963, Ser. No. 300,812
Claims priority, application Germany Aug. 16, 1962,
F 37,600, F 37,601; Oct. 13, 1962, F 38,047;
June 12, 1963, F 39,977
9 Claims. (Cl. 85—70)

The present invention relates to an improved connector for two or more sheet-like workpieces or the like, and more particularly to an improved expansion shield which constitutes a component part of the connector. Still more particularly, the invention relates to an expansion shield and to a connector which latter embodies the improved expansion shield and which also includes a screw or a similar threaded element to provide a releasable connection between two or more workpieces.

It is an object of my invention to provide a very simple and inexpensive expansion shield which may be applied with the help of conventional tools and which may take commercially available screws, bolts and similar threaded elements.

Another object of the invention is to provide an expansion shield of the just outlined characteristics which will automatically remain in requisite position once it is caused to engage one or more workpieces regardless of whether or not the threaded element is separated therefrom.

A further object of the invention is to provide an expansion shield which simultaneously forms a fluidtight corrosion-resistant seal and/or an electrical insulator for one or more conductors or the like.

A concomitant object of the invention is to provide a novel connector which embodies an expansion shield of the above outlined characteristics and to provide a novel method of applying the connector to one or more plates, sheets or similar workpieces.

Still another object of the invention is to provide an improved fastener or connector which is especially suited for securing two or more very thin sheets, plates or similar laminated workpieces in face-to-face abutment or in spaced relation with reference to each other, and which permits rapid and convenient detachment of one or more workpieces as well as rapid connection of additional workpieces.

An additional object of the invention is to provide an expansion shield which automatically prevents loosening of the threaded element once the latter is driven home regardless of whether the workpieces which are connected by the expansion shield undergo temporary or permanent vibration or other types of shocks.

With the above objects in view, one feature of my invention resides in the provision of an expansion shield which comprises an elongated nut consisting of deformable synthetic plastic material and having at least one open end to permit introduction of a threaded stem. The nut comprises an internally threaded end portion arranged to mate with the stem and to thereby effect axial compression of the nut when the other end portion of the nut is caused to abut against a workpiece or against another rigid body. The nut further comprises a tubular intermediate portion which is adjacent to the internally threaded end portion and whose wall thickness is such that it undergoes deformation and forms an annular bead in response to axial compression which is brought about by driving the stem home while the other end portion of the nut abuts against a rigid body.

The nut may be closed at one of its ends so that the internally threaded end portion forms a cup to prevent entry of foreign matter into the interior of the expansion shield. If desired, the nut may be provided with a conical peripheral surface which diverges in a direction away from the internally threaded end portion to automatically anchor the nut in a circular opening whose diameter is less than the maximum diameter of the peripheral surface.

In certain instances, the expansion shield may comprise a second component in the form of a specially configurated plug which abuts against the open end portion of the nut and causes the tubular intermediate portion to form a bead in response to tightening of a screw or another threaded element whose stem meshes with the internally threaded end portion of the nut.

The novel features which are considered as characteristic of the invention are set forth in particular in the appended claims. The improved expansion shield itself, however, both as to its construction and its mode of operation, together with additional features and advantages thereof, will be best understood from the following detailed description of certain specific embodiments with reference to the accompanying drawings, in which:

FIG. 6 is an elevational view of a modified expansion shield which comprises a plastic nut and a plastic plug, each of these parts being partially broken away;

FIG. 7 illustrates the expansion shield of FIG. 6 in a position its parts assume when the shield receives the stem of a screw and is about to be deformed to form with the screw a connector between two or more sheet-like workpieces;

FIG. 8 illustrates the structure of FIG. 7 with the expansion shield in fully deformed condition and with a second workpiece disposed between the head of the screw and the enlarged portion of the plug;

FIG. 9 illustrates the expansion shield in the condition of FIG. 8 and shows two sheet-like workpieces disposed between the deformed portion of the plastic nut and the enlarged portion of the plug;

Figure 1:
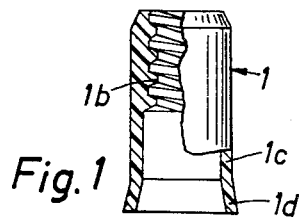
FIG. 1 is a partly elevational and partly axial sectional view of a one-piece expansion shield which assumes the form of a plastic nut.

Referring to the drawings, and first to FIG. 1, there is shown a one-piece expansion shield which assumes the form of an elongated nut 1 consisting of deformable synthetic plastic material, for example, nylon. Both ends of the nut 1 are open and one end portion 1b thereof is provided with internal threads so that it may mate with external threads on the stem 2a of a screw 2 (see FIGS.

2 to 4) which serves to deform the nut and to thereby transform the tubular intermediate portion $1c$ of this nut into an annular bead $1e$. The other end portion $1d$ of the nut assumes the form of a hollow conical frustrum whose wall thickness is preferably the same as or approximates that of the tubular intermediate portion $1c$. As best shown in FIGS. 2 to 5, the peripheral surface of the end portion $1d$ is provided with axially parallel ribs $1d'$ or with similar protuberances which prevent undesirable angular movements of the nut when the tubular intermediate portion $1c$ is subjected to axial compression and is transformed into a bead $1e$. Thus, the bead is formed in response to axial movement of the internally threaded end portion $1b$ in a direction toward the conical end portion $1d$ while the end face of the end portion $1d$ abuts against a rigid body such as the upper side of a thin plate like workpiece 4 consisting of sheet metal, of plastic or the like. It will be noted that the wall thickness of the internally threaded end portion $1b$ exceeds that of the portions $1c$, $1d$ so that the end portion $1b$ undergoes less deformation when the axial length of the nut 1 is reduced.

Figure 2:
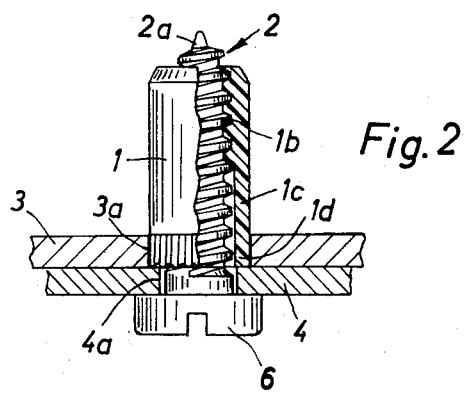
FIG. 2 illustrates the plastic nut partly broken away and in a position it assumes when it is about to be deformed by a screw to form with the screw a connector between two sheet-like workpieces.
Figure 3:
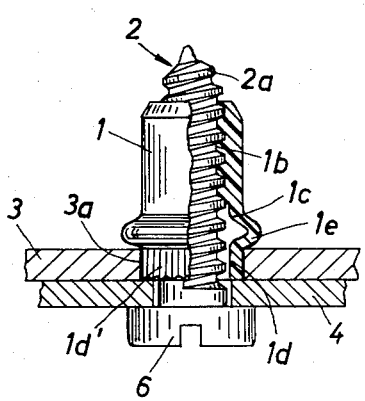
FIG. 3 illustrates the structure of FIG. 2 with the plastic nut in partially deformed condition.
Figure 4:
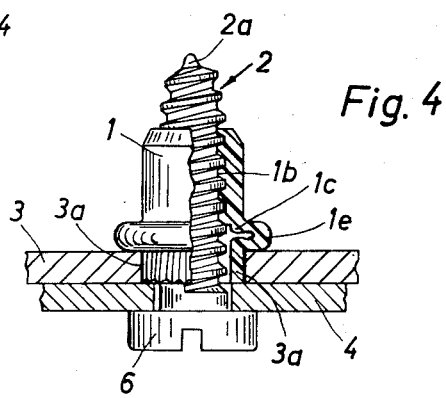
FIG. 4 illustrates the structure of FIGS. 2 and 3 with the plastic nut in fully deformed condition.

FIGS. 2 to 4 illustrate the manner of securing the nut 1 in the circular opening $3a$ of a sheet-like workpiece 3 and of simultaneously securing this workpiece in face-to-face abutment with the workpiece 4. In the first step, the nut 1 (while still in undeformed condition) is forced through the opening $3a$ of the workpiece 3 by passing the nut upwardly, as viewed in FIG. 2, until the end portion $1d$ reaches the opening $3a$. As a rule, the outer diameter of the end portion $1d$ exceeds the diameter of the opening $3a$ so that the end portion $1d$ undergoes some deformation and that its protuberances $1d'$ move into frictional engagement with the surface bounding the opening $3a$. This insures that the nut is held against rotation at the time it is subjected to axial compression.

In the next step, the operator places the upper side of the workpiece 4 into abutment with the underside of the workpiece 3 so that the circular opening $4a$ of the workpiece registers with the opening $3a$. It will be noted that the diameter of the opening $4a$ is somewhat less than the diameter of the opening $3a$ so that the lower end face of the nut 1 abuts against the upper side of the lower workpiece 4. In other words, the workpiece 4 serves as a stop to insure that the nut is subjected to axial compression and that the tubular intermediate portion $1c$ begins to bulge outwardly as soon as the stem $2a$ is moved into mesh with the end portion $1b$ and as soon as the operator begins to rotate the screw 2 in a sense to move the head 6 into abutment with the underside of the workpiece 4. FIG. 3 illustrates an intermediate stage in the movement of the internally threaded end portion $1b$ toward the conical end portion $1d$ whereby the annular bead $3e$ overlies the upper side of the workpiece 3 and forms an airtight seal which prevents passage of dust or moisture through the opening $3a$. When the stem $2a$ is driven home, the workpieces 3, 4 are in full face-to-face abutment with each other and the axial length of the deformed tubular intermediate portion $1c$ equals or is slightly greater than the height of the annular bead $1e$. Furthermore, the threads of the end portion $1b$ are deformed into strong frictional engagement with the threads of the stem $2a$ so that the screw 2 is held against rotation not only because the threads of its stem mesh with the slightly deformed threads of the end portion $1d$ but also because the bead $1e$ performs the function of an elastic washer which retains the screw in the position of FIG. 4 even if the workpieces 3, 4 are subjected to continuous or intermittent vibratory stresses. The protuberances $1d'$ remain in strong frictional engagement with the surface surrounding the opening $3a$ to prevent rotation of the nut at the time the screw 2 is driven home. This screw has been shown in the form of commercially available fillister head cap screw, but it is obvious that any other conventional threaded element may be used in its stead as long as its threads mesh with the threads of the portion $1b$.

Once the nut 1 is deformed to form the bead $1e$, the screw 2 may be withdrawn as often as desired without any danger that the conical end portion $1d$ will escape from the opening $3a$. In other words, the connection provided by the nut 1 and screw 2 may be terminated and/or reestablished as often as desired so that the operator may add one or more workpieces or that the operator may remove the workpiece 4. Also, the nut 1 may serve as an insulating shell so that the operator may introduce one or more electric conductors therethrough.

Figure 5:
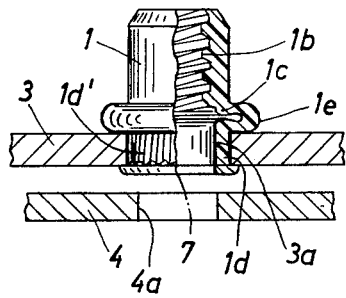
FIG. 5 illustrates the plastic nut in deformed condition with the screw removed and with one of the workpieces slightly spaced from the other workpiece.

FIG. 5 illustrates the nut 1 in deformed condition in which the nut forms a rivet-shaped insulating shell which extends through and beyond both ends of the opening $3a$ of the workpiece 3. As shown, a length of the conical end portion $1d$ extends beyond the underside of the workpiece 3 and is upset to form an annular collar 7 which overlaps the underside of this workpiece so that the workpiece is held between the bead $1e$ and collar 7 whereby the nut is held against axial movement with respect to the workpiece. Such upsetting may be brought about by holding the workpiece 4 at a small distance from the underside of the workpiece 3 while the nut 1 is subjected to the compressive action of the screw 2 so that the lowermost part of the conical end portion $1d$ will have some room to expand by entering the gap between the workpieces. The nut of FIG. 5 is especially suited to form a permanent insulating shell for one or more electric conductors or the like. The workpiece 4 may serve as an accessory or upsetting tool in deforming the nut 1 and need not be connected to the workpiece 3 at all. Of course, in some instances, the collar 7 may serve the purpose of keeping the workpiece 4 at a certain distance from the workpiece 3 if the operator decides to drive the screw 2 home and to thereupon leave the screw in such position once the nut is deformed to assume the form shown in FIG. 5.

It was found that the nut of FIGS. 1 to 5 is especially suited for use in automobile industry wherein it serves to connect two or more metallic or plastic sheets, plates or similar workpieces and wherein it may also serve to form an insulating shell for electric conductors or the like. It goes without saying that the workpiece 3 may assume the form of a laminated structure consisting of two or more thinner sheets or plates so that, even in the position of FIG. 5, the nut may serve as a conductor for two or more workpieces regardless of whether or not the screw remains connected thereto. The collar 7 cooperates with the bead $1e$ to prevent penetration of any foreign matter into the space between the surface surrounding the opening $3a$ and the periphery of the end portion $3d$ regardless of whether the stem of the screw 2 remains in mesh with the end portion $1b$. The wall thickness of the portions $1b$, $1c$, $1d$ will depend on the intended use of the expansion shield, on the length of the screw, on the diameter of the opening $3a$, and/or on the nature of the material of which the shield is made.

When the screw is driven home to reduce the axial length of the nut and to form the bead $1e$, the conical end portion $1d$ also tends to expand and thereby moves its protuberances $1d'$ into stronger frictional engagement with the surface surrounding the opening $3a$ to prevent rotation of the nut. This is of particular advantage when the workpieces must be moved into full face-to-face abutment with each other, i.e., when the head 6 of the screw 2 must come into actual abutment with the underside of the workpiece 4.

FIG. 6 illustrates a modified expansion shield which includes two components, namely, a nut 11 whose configuration is substantially identical with that of the nut 1 and a specially configurated plug 8. The nut consists of deformable synthetic plastic material and comprises a comparatively thick-walled internally threaded end portion $11b$, a comparatively thin-walled tubular intermediate portion 11c, and a hollow conical second end portion 11d whose wall thickness diminishes in a direction toward the open lower end of the nut, as viewed in FIG. 6. The conically outwardly diverging internal surface of the end portion 11d is identified by a reference numeral 11f and this end portion is provided with external protuberances 11d'.

The plug 8 consists of synthetic plastic material which may be the same as that of the nut 11 and is formed with a central bore 8b for the passage of the stem 2a. The material or the wall thickness of the plug is selected in such a way that it is more resistant to deformation than the portions 11c, 11d of the nut 11. The plug includes a tubular extension or neck 9 which may be received in the end portion 11d and an enlarged portion in the form of an annular flange 9a which is formed with an annular upsetting channel 8a of concave cross section. The channel 8a surrounds the root portion of the neck 9 and the latter is provided with external projections in the form of axially extending ribs 17.

FIGS. 7 and 8 illustrate the manner in which the composite expansion shield 11, 8 of FIG. 6 may be secured to a thin sheet-like workpiece 12. In the first step, the operator introduces the nut 11 into the opening 12a of the workpiece so that the protuberances 11d' abut against the surface surrounding the opening 12a and that a length of the end portion 11d extends downwardly and beyond the underside of the workpiece 12. In the next step, the operator introduces the neck 9 into the end portion 11d so that the projections 17 pentrate into the internal surface 11f and cause the end portion 11d to expand into strong frictional engagement with the material of the workpiece. This insures that the nut 11 will not rotate when the operator introduces the stem 2a of the screw 2 and when the operator thereupon rotates the screw in a sense to move the internally threaded end portion 11b toward the opening 12a. As a result of such axial shortening of the nut, the intermediate portion 11c is caused to expand and forms an annular bead 11e which overlies the upper side of the workpiece 12 to form a fluidtight seal around the opening. At the same time, the end face 11g of the end portion 11d slides in the channel 8a radially outwardly to transform a length of the end portion 11d into a collar which comes into sealing abutment with the underside of the workpiece 12, see FIG. 8. As the screw 2 is being drawn tight, the neck 9 is caused to penetrate deeper into the nut and moves the protuberances 11d' into stronger frictional engagement with the material of the workpiece so that the resistance which the nut offers to rotation increases proportionally with progressing rotation of the scrtw. The workpiece is now clamped between the flange formed by the end portion 11d and the peripheral portion of the collar 9a on the one hand, and the bead 11e on the other hand. The composite expansion shield will remain in the position of FIG. 8 even if the screw 2 is removed and, since the material of the end portion 11b also undergoes some deformation, its threads engage the threads on the stem 2a with considerable friction to prevent loosening of the screw in response to shocks or vibrations to which the connector including the screw 2 and the shield 11, 8 is subjected in actual use. FIG. 8 actually shows the connector subsequent to removal and reinsertion of the screw 2. The head 6 of the screw presses a sheet-like second workpiece 13 against the flange 9a of the plug 8 so that the second workpiece is held at a predetermined distance from the workpiece 12. Additional workpieces may be received between the head 6 and the flange 9a if necessary. The workpiece 12 may be exceptionally thin, e.g., this workpiece may assume the form of a metallic or plastic sheet with a thickness of 0.7 mm. or even less. Such thin sheets are often used in automobile industry.

Owing to the fact that the projections 17 of the plug 8 will expand the end portion 11d into strong frictional engagement with the material of the workpiece, the nut 11 is held against rotation even if the workpiece 12 is exceptionally thin to insure that the screw 2 may be driven home without it being necessary to hold the nut against rotation by means other than the frictional engagement of protuberances 11d' with the surface surrounding the opening 12a. Of course, the workpiece 12 may be replaced by two or more workpieces, and this workpiece may consist of textile material, depending on the intended use of the connector. The openings 12a and 13a may be machined with the help of conventional drilling machines and may be of circular shape. This constitutes a considerable advantage because conventional tools may be used to drill the openings in contrast to certain known connectors whose nuts must be held against rotation in non-circular openings.

It goes without saying that the composite expansion shield of FIG. 6 is equally useful in connectors for comparatively thick sheets, plates and similar workpieces, especially when it is necessary to drive the screw home with great force such as could cause rotation of the nut in a truly round opening.

In a mass-manufacturing operation, a first operator will insert the nut 11 into one or more sheet-like workpieces and will simultaneously force the neck 9 into the end portion 11d of the corresponding nut. A second operator will follow with a screwdriver and will apply the screws to deform the nuts and to form the beads 11e simultaneously with the formation of flanges by upsetting the projecting lengths of the end portions 11d in response to movement of the plugs 8 toward the workpiece. The composite expansion shield of FIG. 6 is very useful as an insulating shell because the material of the plug forms a second insulating wall in addition to the insulating wall formed by the nut proper.

Alternatively, the nut 11 and the plug 8 may be combined prior to insertion of the expansion shield into the opening of a workpiece. Thus, the operator can force the neck 9 into the end portion 11d in a first step prior to introducing the nut 11 into the opening 12. Since the neck is more resistant to deformation, it maintains the end portion in expanded condition so that the protuberances 11d' will engage the surface surrounding the opening 12a and will hold the assembled expansion shield against rotation when the stem 2a is being driven home. When the stem is being driven home, the flange 9a performs the same function as the work-piece 4 of FIG. 5 by holding the end portion 11d against axial movement and by simultaneously upsetting a length of this end portion to form the flange whose end face 11g may but need not always be moved into actual abutment with the underside of the workpiece 12. In FIG. 8, the lower part of the nut 11 (from the threaded end portion 11b down) resembles a rivet which overlaps the workpiece 12 at both sides of the opening 12a.

The expansion shield of FIG. 6 may be utilized in a manner shown in FIG. 9 in which it connects two sheet-like workpieces 14, 15 even though the diameters of openings 14a, 15a are the same. Thus, the plug 8 performs the function of the workpiece 4 in FIGS. 2 to 4 in that it serves as an abutment for the end face 11g to prevent axial movement of the end portion 11d at the time the operator applies the screw 2. The flange-like length of the end portion 11d and the bead 11e constitute two washers which overlap the outer sides of the workpieces 14, 15, and, if desired, the screw 2 may serve to secure a third workpiece 16 (shown in phantom lines) at a predetermined distance from the underside of the workpiece 15.

Figure 10:
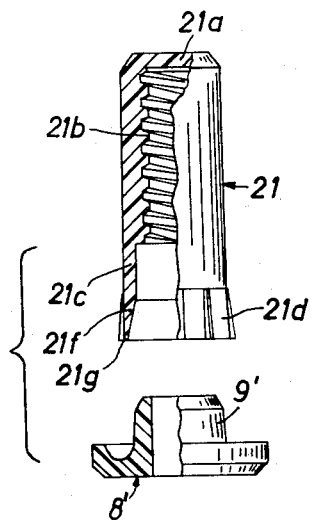
FIG. 10 is an exploded elevational view of a third expansion shield which includes a cup-shaped plastic nut and a plastic plug, each of these parts being partially broken away.
Figure 11:
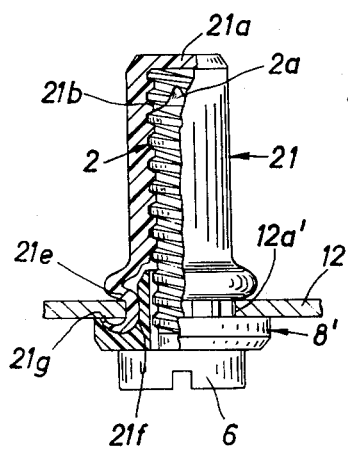
FIG. 11 illustrates the plastic nut of FIG. 10 in deformed condition whereby the expansion shield cooperates with a conventional screw to form a tight seal along the opposite sides of an apertured sheet-like workpiece.

Referring to FIG. 10, there is shown a two-piece expansion shield which comprises a plug 8' and a modified nut 21 having an open end surrounded by the end face 21g of the end portion 21d and a closed end defined by the bottom wall 21a of the cup-shaped internally threaded end portion 21b. The axial length of the end portion 21b is greater than in the nut of FIGS. 1 to 9 (i.e., it exceeds substantially the length of the intermediate portion 21c) to make sure that this end portion will accommodate the stem 2a when the screw 2 is driven home to deform the intermediate portion 21c and to form the bead 21e, see FIG. 11. The construction of the plug 8' is analogous to that of the plug 8 excepting that the ribs 17 are dispensed with. The neck 9' will engage the internal surface 21f and will expand the end portion 21d into strong frictional engagement with the surface surrounding the opening 12a' of a sheet-like workpiece 12' when the expansion shield is assembled in the manner shown in FIG. 11.

An important advantage of the bottom wall 21a is that it prevents penetration of moisture or dirt into the expansion shield and that it protects the stem 2a against corrosion. For example, the nut 21 may be mounted in such a way that its end portion 21b extends outwardly and that the plug 8' is concealed in the interior of an automotive vehicle, a boat or another conveyance. Since the bead 21e forms an airtight seal around the opening 12a', the nut forms an airtight seal and protects the screw 2 as well as other parts at the underside of the workpiece 12' against corrosion by contact with air, moisture or dirt.

Figure 12:
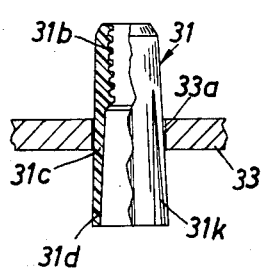
FIG. 12 illustrates a modified one-piece expansion shield which comprises a conically configurated plastic nut, a portion of the nut being broken away.

Referring to FIG. 12, there is shown a fourth expansion shield which comprises a specially configured nut 31 having an internally threaded end portion 31b, a tubular intermediate portion 31c and a second end portion 31d. The wall thickness of the nut diminishes in a direction from the end portion 31b toward the end face of the end portion 31d, and the peripheral surface of the nut is of conical shape, i.e., the maximum diameter end is the lower end of the nut, as viewed in FIG. 12. This peripheral surface is provided with axially extending protuberances in the form of ribs 31k whose thickness diminishes in a direction from the end portion 31d toward the end portion 31b. The ribs 31k terminate short of the upper end of the nut.

Figure 13:
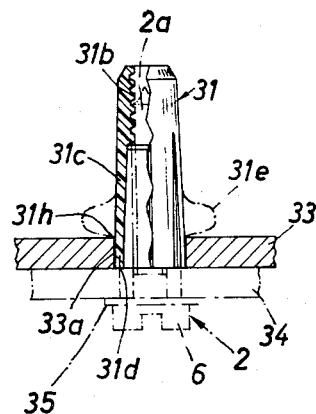
FIG. 13 illustrates the plastic nut in position within the opening of a sheet-like workpiece, a second workpiece and a screw which serves to deform the nut being indicated in phantom lines.

An important advantage of this conical nut is that it can be anchored in the opening 33a of a workpiece 33 with considerable force, especially if the outer diameter of the end portion 31d exceeds appreciably the diameter of the opening 33a. The ribs 31k will engage the material of the workpiece 33 and will hold the nut against rotation when the screw 2 is driven home. In FIG. 13, the screw 2 (shown in phantom lines) serves to secure the workpiece 33 in face-to-face abutment with a second workpiece 34

Owing to the fact that the wall thickness of the nut diminishes in a direction toward the end face of the end portion 31d, the material of the nut will tend to bulge outwardly (at the point indicated by the reference numeral 31h) even before the screw 2 is driven home. Thus, a small bead (which subsequently develops into a full-sized bead 31e (see the phantom lines in FIG. 13), is formed in a fully automatic way even before the nut is subjected to axial compression. The diameter of the bore in the workpiece 34 is somewhat smaller than the diameter of the opening 33a so that the workpiece 34 serves as a stop for the end face of the end portion 31d and prevents axial movement of this end portion when the screw 2 is driven home. A metallic or elastic washer 35 may be inserted between the head 6 and the underside of the workpiece 34. In undeformed condition of the nut, the ribs 31k are disposed on the periphery of a circle whose diameter is at least slightly greater than the diameter of the opening 33a. The plug 8 consists of a corrosion resistant synthetic plastic material such as nylon or polyamide.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of this invention and, therefore, such adaptations should and are intended to be comprehended within the meaning and range of equivalence of the following claims.

What is claimed as new and desired to be secured by Letters Patent is:

1. An expansion shield, comprising an elongated nut consisting of deformable synthetic plastic material and including an internally threaded end portion, a tubular intermediate portion and a second end portion; and a plug constituting a permanent part of the expansion shield, said plug having a central bore and including a neck arranged to extend into and to expand said second end portion of said nut, and an annular flange surrounding said neck and arranged to upset said second end portion in response to axial compression of the nut by a threaded element passing through said bore and meshing with said internally threaded end portion whereby said intermediate portion forms an annular bead while the internally threaded portion moves toward said plug.

2. An expansion shield, comprising an elongated nut consisting of deformable synthetic plastic material and including an internally threaded end portion, a tubular intermediate portion and a second end portion, said second end portion having a conical internal surface which diverges in a direction away from said intermediate portion; and a plug constituting a permanent part of the expansion shield, said plug having a central bore and including a neck arranged to extend into and to expand said second end portion of said nut, and an annular flange surrounding said neck and arranged to upset said second end portion in response to axial compression of the nut by a threaded element passing through said bore and meshing with said internally threaded end portion whereby said intermediate portion forms an annular bead while the internally threaded portion moves toward said plug.

3. An expansion shield, comprising an elongated nut consisting of deformable synthetic plastic material and including an internally threaded end portion, a tubular intermediate portion whose wall thickness is less than the wall thickness of said end portion, and a second end portion having a peripheral surface provided with a plurality of protuberances; and a plug constituting a permanent part of the expansion shield, said plug consisting of synthetic plastic material and having a central bore for the passage of a threaded stem which is moved into mesh with said internally threaded end portion, said plug comprising a neck arranged to extend into and to expand said second end portion and an annular flange surrounding said neck and arranged to upset a length of said second end portion in response to axial compression of the nut whereby the intermediate portion of the nut forms an annular bead while the internally threaded portion moves toward said plug in response to rotation of the threaded stem.

4. An expansion shield, comprising an elongated nut consisting of deformable synthetic plastic material and including an internally threaded end portion, a tubular intermediate portion whose wall thickness is less than the wall thickness of said end portion, and a second end portion; and a plug constituting a permanent part of the expansion shield, said plug having a central bore and including a neck arranged to extend into and to expand said second end portion, and an annular flange surrounding said neck and arranged to upset a length of said second end portion in response to axial compression of said nut by a threaded element passing through said bore and meshing with said internally threaded end portion whereby said intermediate portion forms an annular bead, said flange having an annular channel of concave cross section along which said length of the second end portion slides and expands in response to axial compression of the nut.

5. An expansion shield, particularly for use with a sheet-like work-piece having an aperture of predetermined diameter, comprising an elongated nut extending into said aperture and consisting of deformable synthetic plastic material, said nut including an internally threaded end portion spaced from one side of the work-piece, a tubular intermediate portion whose wall thickness is less than the wall thickness of said end portion, and a second end portion received in said aperture and a part thereof extending at least slightly beyond the other side of the work-piece; a plug having a central bore and including a neck extending into said second end portion, and an annular flange surrounding said neck, said flange having an annular channel of concave cross section facing said part of said nut; and elongated threaded fastener means extending through said bore and meshing with said internally threaded end portion of said nut for maintaining said nut in axially compressed condition whereby said intermediate portion of said nut is maintained in an outwardly bulged condition resembling an angular bead adjacent the one side of the work-piece and said second end portion of said nut is maintained in expanded condition by said plug and compelled at least in part to assume the shape of said concave channel.

6. As a novel article of manufacture, a composite expansion shield comprising an elongated nut consisting of deformable synthetic plastic material and including an internally threaded end portion, a tubular intermediate portion whose wall thickness is less than the wall thickness of said internally threaded portion, and a second end portion having an open end; and a plug constituting a permanent part of the expansion shield, said plug having a central bore which permits the passage of a threaded stem through said second end portion and said intermediate portion into mesh with said internally threaded portion, said plug comprising a neck received in and in deforming engagement with said second end portion and an annular flange surrounding said neck and arranged to bring about additional expansion and upsetting of said second end portion in response to axial compression of the nut whereby the intermediate portion of the nut is expanded and forms an annular bead opposite said flange.

7. As a novel article of manufacture, particularly for insertion in the circular opening of a thin sheet-like workpiece, a composite expansion shield comprising an elongated nut consisting of deformable synthetic plastic material and including an internally threaded end portion, a tubular intermediate portion whose wall thickness is less than the wall thickness of said internally threaded portion, and a second end portion having an open end; and a plug constituting a permanent part of the expansion shield, said plug having a central bore which permits the passage of a threaded stem through said second end portion and said intermediate portion into mesh with said internally threaded portion, said plug comprising a neck received in and in deforming engagement with said second end portion and an annular flange surrounding said neck and arranged to bring about additional expansion and upsetting of said second end portion in response to axial compression of the nut whereby the intermediate portion of the nut is expanded and forms an annular bead opposite said flange, the wall thickness of said neck exceeding the wall thickness of said second end portion so that the latter expands in a fully automatic way in response to introduction of said neck.

8. A method of securing an elongated expansion shield which consists of deformable synthetic plastic material and one end portion of which is provided with internal threads in the opening of a thin workpiece, comprising the steps of introducing the other end portion of the shield into the opening and simultaneously deforming said other end portion into strong frictional engagement with the wall of the opening in the workpiece; placing a non-rotatable element having an outer and an inner face with said inner face thereof superimposed on said workpiece so that said non-rotatable element is located adjacent to said opening; introducing the screw-threaded portion of a screw having a screwhead through the other end portion and into mesh with the threaded portion of the shield while holding the other end portion against axial and rotational movement and while said screwhead is superimposed on said outer face of said non-rotatable element so that said non-rotatable element is located between said other end portion of said shield and said screwhead, preventing frictional engagement of said shield and said screwhead, and rotating said screw by rotating said screwhead without said screwhead directly engaging said other end portion of said shield so as to move the threaded end portion of said shield toward said other end portion thereof while said screwhead of said screw abuts only against said outer face of said non-rotatable element whereby no rotational moment is imparted to said shield by direct engagement of said screwhead and said other end portion of said shield so that said screw-threaded portion of said screw is threaded into said threaded end portion of the shield resulting in expansion of the intermediate portion of said shield and formation of an annular bead between the threaded end portion and the other end portion of said shield and deformation of said threaded end portion of said shield into strong frictional engagement of the same with said screw.

9. A method of securing an elongated expansion shield which consists of deformable synthetic plastic material and one end portion of which is provided with internal threads in the opening of a thin workpiece, comprising the steps of introducing the other end portion of the shield into the opening so that a length of the other end portion is located at one side and that the remainder of the shield is located at the other side of the opening; placing a non-rotatable element having an outer and an inner face with said inner face superimposed on said length of the other end portion of said shield; introducing the screw-threaded portion of a screw having a screwhead through the other end portion and into mesh with the threaded end portion of the shield while holding the other end portion against axial and rotational movement so that said screwhead of said screw is superimposed on said outer face of said non-rotatable element located between said length of said other end portion of said shield and said screwhead, preventing frictional engagement of said shield and said screwhead; and rotating said screw by rotating said screwhead without said screwhead engaging said length of said end portion of said shield so as to move the threaded end portion towards the other end portion forming an annular bead between the threaded end portion and the other end portion and simultaneously upsetting said length of said other end portion against the workpiece so that said other end portion forms an annular collar which co-operates with said bead to anchor the shield in the workpiece.

References Cited by the Examiner

UNITED STATES PATENTS

| | | | |
|---|---|---|---|
| 928,947 | 7/1909 | Dawson | 85—40 |
| 2,150,080 | 3/1939 | Rawlings. | |
| 2,236,079 | 3/1941 | Wipper | 85—40 |
| 2,341,598 | 2/1944 | Crowley | 85—40 |
| 2,516,554 | 7/1950 | Coyne. | |
| 2,670,021 | 2/1954 | Torresen et al. | 85—70 |
| 2,887,926 | 5/1959 | Edwards | 85—40 |
| 2,914,106 | 11/1959 | Boyd | 85—40 |
| 3,030,705 | 4/1962 | Gill | 85—40 |
| 3,131,743 | 5/1964 | Hinkle | 85—70 |

FOREIGN PATENTS 613,882  12/1948  Great Britain.

CARL W. TOMLIN, *Primary Examiner.*

EDWARD C. ALLEN, *Examiner.*

M. PARSON, JR., *Assistant Examiner.*